(12) United States Patent
Shortridge, Sr.

(10) Patent No.: US 9,458,884 B2
(45) Date of Patent: Oct. 4, 2016

(54) BEARING SURFACE COATING

(71) Applicant: Robert Alan Shortridge, Sr., Powhatan, VA (US)

(72) Inventor: Robert Alan Shortridge, Sr., Powhatan, VA (US)

( * ) Notice: Subject to any disclaimer, the term of this patent is extended or adjusted under 35 U.S.C. 154(b) by 0 days.

(21) Appl. No.: 14/461,758

(22) Filed: Aug. 18, 2014

(65) Prior Publication Data

US 2016/0047416 A1    Feb. 18, 2016

(51) Int. Cl.
| F16C 33/18 | (2006.01) |
| C08K 5/13 | (2006.01) |
| C09D 193/00 | (2006.01) |

(52) U.S. Cl.
CPC .............. *F16C 33/18* (2013.01); *C08K 5/13* (2013.01); *C09D 193/00* (2013.01)

(58) Field of Classification Search
CPC .................................................. C08L 93/00
USPC ................... 508/100, 101; 106/218; 427/417
See application file for complete search history.

(56) References Cited

U.S. PATENT DOCUMENTS

| 5,093,082 A * | 3/1992 | Watanabe ............... C09F 1/02 422/424 |
| 2002/0051586 A1* | 5/2002 | Orndorff, Jr. ......... B63H 23/326 384/98 |
| 2010/0009877 A1* | 1/2010 | Greaves ............ C08G 65/2609 508/304 |
| 2010/0124568 A1* | 5/2010 | Eramo .................. A61K 9/288 424/465 |
| 2010/0305241 A1* | 12/2010 | Balakshin ................ A23K 1/12 524/74 |
| 2012/0136097 A1* | 5/2012 | Berlin ...................... C07G 1/00 524/73 |
| 2014/0046041 A1* | 2/2014 | South ...................... C08H 8/00 530/507 |

* cited by examiner

*Primary Examiner* — Ellen Mcavoy
(74) *Attorney, Agent, or Firm* — Thomas & Karceski, P.C.

(57) ABSTRACT

A coating mixture is presented for use on a bearing surface. The coating mixture includes a *Guaiacum* resin and a solvent in which the *Guaiacum* resin is dissolved. The *Guaiacum* resin may be about 50% or more of the coating mixture. The solvent may be an alcohol, for instance ethanol.

15 Claims, 3 Drawing Sheets

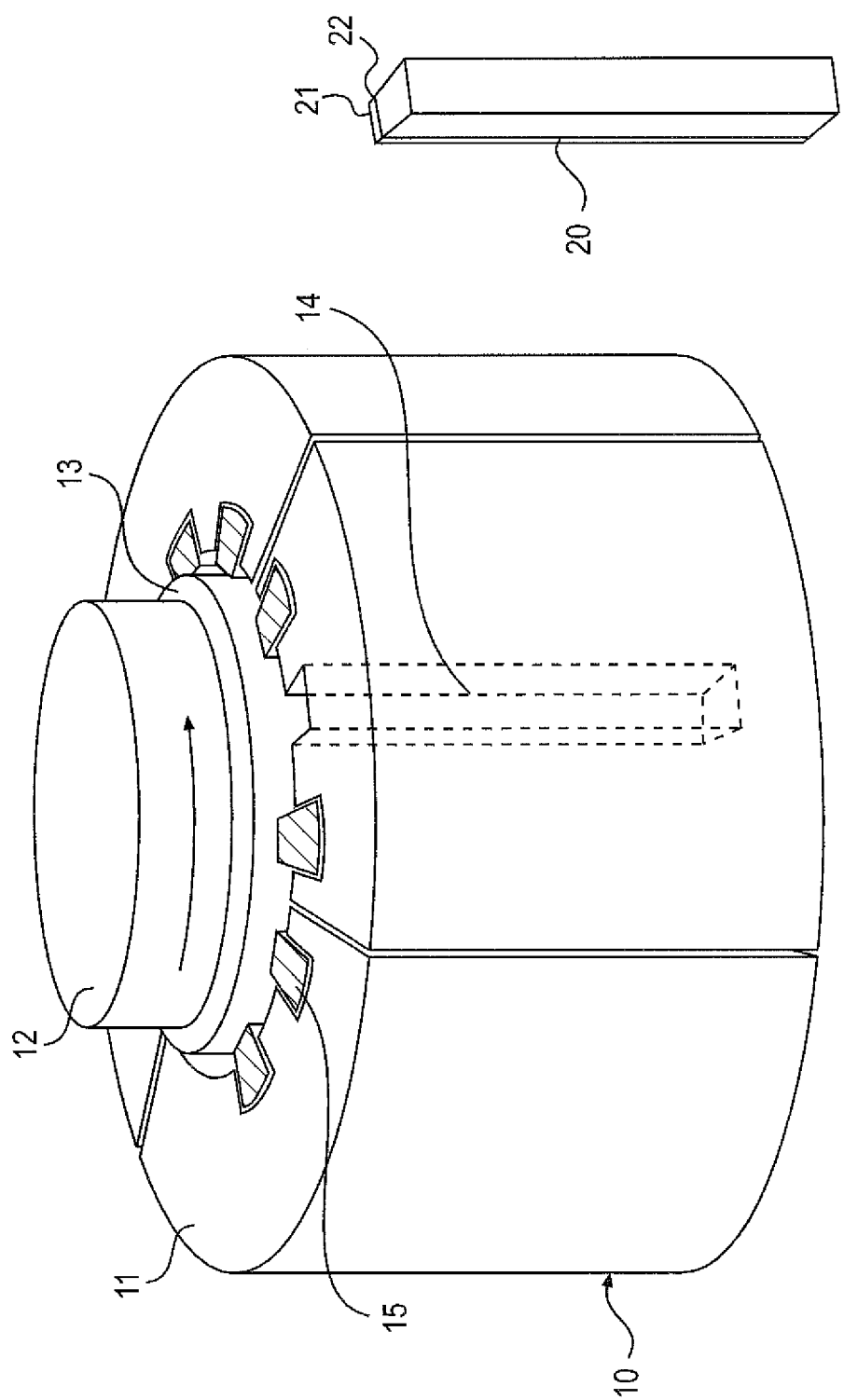

BEARING SURFACE COATING

The present invention is directed to bearings, for instance stave bearings that are mounted around a rotating shaft. The side of the bearing that comes into contact with the rotating shaft is coated with a liquid mixture that includes a *Guaiacum* resin.

BACKGROUND

Rotating shafts are traditionally held in place through the use of one or more bearing devices. Especially with respect to larger, vertically-oriented shafts, one type of bearing that is used is a stave bearing. In these stave bearing devices, multiple staves are placed around the circumferential perimeter of a rotating shaft to hold the shaft in place. As expected, the wear on the surface of the stave bearing that is in contact with the rotating shaft is a servicing concern. In other words, as the surface of the stave bearing wears down, then the stave bearing may need to be replaced. Other bearings may be used with horizontally-oriented shafts. In all cases, different materials have comparatively different durability with respect to wear rates. *Guaiacum* wood, also known as lignum vitae, is one type of bearing material that has been and is used in various bearing devices.

The resin or gum from *Guaiacum* wood is used and has historically been used as a medicine for the treatment of various diseases. Derivatives of the resin have also been used in medical testing procedures.

SUMMARY

It is an object of the present invention to provide a coating mixture that may be applied to the surface of a bearing. The coating will improve the durability of the bearing by forming a tough and smooth layer of resin that bears against a turning shaft inside the bearing. In one example, the coating mixture on a bearing surface comprises a *Guaiacum* resin and a solvent in which the *Guaiacum* resin is dissolved. The *Guaiacum* resin may comprise about 50% or more of the coating mixture, or alternatively 90% or more of the coating mixture. The solvent may comprise an alcohol, for example ethanol.

In another alternative, a bearing comprises a bearing surface adapted to contact a rotating shaft surface. The bearing surface is coated with a coating layer comprising a *Guaiacum* resin. The *Guaiacum* resin is coated on the bearing surface at a thickness of about 0.1 mil to 0.5 inches, or alternatively 1 mil to 0.25 inches. The bearing may be wood, for example lignum vitae.

In an another example, a method of improving the wear resistance of a bearing comprises a bearing surface adapted to contact a rotating shaft surface. The method comprises the steps of providing a coating mixture comprised of *Guaiacum* resin dissolved in a solvent, and applying a layer of the coating mixture onto a bearing surface adapted to contact a rotating shaft surface.

BRIEF DESCRIPTION OF THE DRAWINGS

FIG. 1 is a perspective view of a stave bearing assembly and a rotating shaft mounted therein.

FIG. 2 is a perspective view of a single stave adapted for use in a stave bearing assembly.

DETAILED DESCRIPTION

Figure 3:
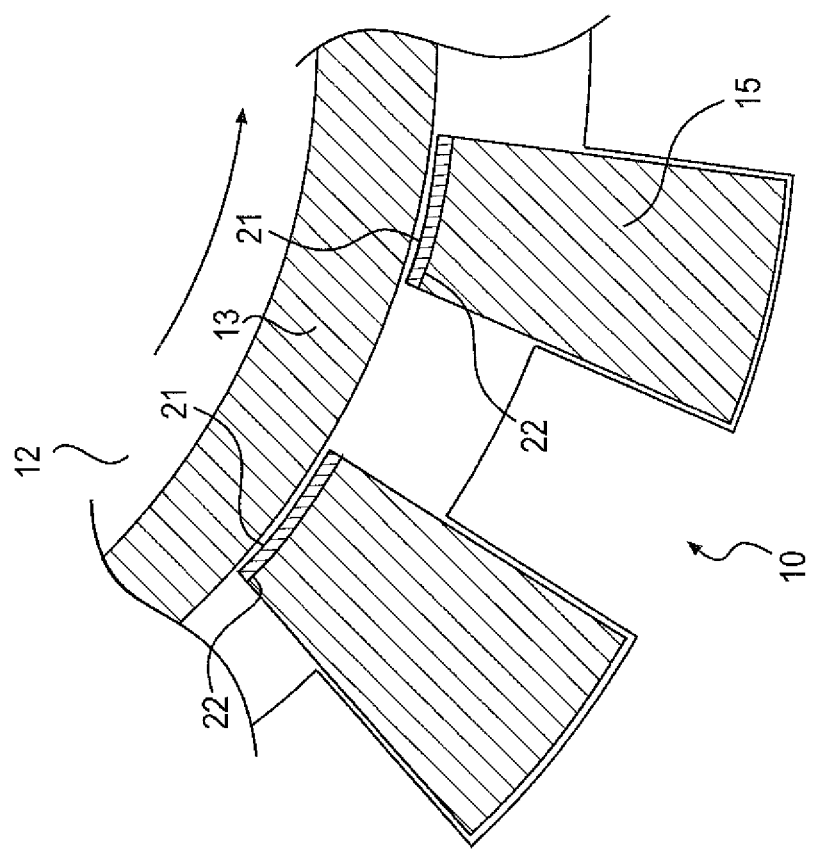
FIG. 3 is a top partial cross-sectional view of stave bearings mounted in a stave bearing assembly around a rotating shaft.

A *Guaiacum* resin coating can be used to improve the wear resistance of a bearing surface. It is believed that the *Guaiacum* resin that is naturally present in lignum vitae wood helps maintain and reinforce the durability of the surface of a bearing, for example a lignum vitae wood bearing. By extracting the *Guaiacum* resin from lignum vitae wood, then adding a solvent carrier for workability, the *Guaiacum* resin can be coated on a bearing surface to impart improved durability to that surface. Improved durability extends the life of the bearing and may reduce maintenance costs over time.

For the purposes of the present invention, lignum vitae is a common name used to describe the *Guaiacum* genus of trees that are native to subtropical and tropical regions of the Americas. The specific lignum vitae wood comes from three *Guaiacum* species—*Guaiacum coulteri*, *Guaiacum officinale* and *Guaiacum sanctum*. The use of the term *Guaiacum* or lignum vitae herein refers to any one of the foregoing species of tree.

There is also a further type of tree that is often referred to as a lignum vitae tree but that is not. It is a close relative to the true lignum vitae trees of the genus *Guaiacum*. This other type of wood is referred to as Argentine lignum vitae or a tree from the genus of *Bulnesia*. The common wood species of this *Bulnesia* genus are *Bulnesia arborea* and *Bulnesia sarmientoi*.

The coating described herein may also be applied to any hard wood. Hard wood refers to the relative hardness of a wood as measured on the Janka scale. For use as a bearing, it is preferred that very hard woods are used. Lignum vitae is one of the very hardest of hard woods and has a Janka scale rating of about 4,500. It is believed that durability benefits may also be enjoyed if the *Guaiacum* resin is coated on other hard woods having a Janka scale rating of about 3,000 or more, or alternately about 2,500 or more. The native lignum vitae wood is likely the best substrate onto which to coat the *Guaiacum* resin, because it is the native source of the *Guaiacum* resin. However, the benefits may be enjoyed with other hard woods that could be used as bearings.

The *Guaiacum* resin is extracted from lignum vitae wood. Lignum vitae wood chips, preferably waste or byproduct chips, are soaked in and heated in a polar solvent. In one example, this solvent can be an alcohol, specifically denatured alcohol (ethanol). Other solvents expected to be useful in alternative examples include alcohols such as methanol and isopropyl alcohol. It is believed that ketones may also be effective polar solvents including, for example, acetone, methyl ethyl ketone, and methyl isobutyl ketone. Other solvents are no doubt possible and available for use. The solvent acts as an extraction fluid as well as a carrier fluid that makes the *Guaiacum* resin relatively easier to handle.

The active ingredient of the coating described herein is the *Guaiacum* resin. The solvent is used to deliver the *Guaiacum* resin wherever appropriate. If coating a surface like a thin varnish, then relatively more dilute solutions of *Guaiacum* resin in a solvent are preferred. If a thicker coating material is desired, then less solvent is used. The *Guaiacum* resin can be approximately 2 to 99% of a coating mixture, or alternatively 5 to 80%, or 50 to 75% of a coating mixture. Often, the *Guaiacum* resin comprises about 20% or greater or 50% or greater or 90% or greater of a coating mixture.

The coating mixture is made up of at least the *Guaiacum* resin and a solvent. However, other components may be added such as a dispersant, smoothing agent, dyes, or any other components that are added in coating materials.

The coating process itself will vary depending on the specific application of the *Guaiacum* resin. The coating may be painted on with a brush or spray like a conventional varnish. The coating may be applied in multiple coats including two or more coats, or alternatively 2 to 25 coats, or alternatively 3 to 10 coats. With an alcohol solvent, the alcohol dries quickly and the mixture can be reapplied in multiple coats in a short period of time. The mixture is applied only onto the surface of the bearing, for instance horizontal bearings, that comes into contact with the surface of a rotating shaft being held in place. One example of such a bearing is a stave bearing. Other types and groups of bearings, for instance horizontal bearings, that press against the surface of a rotating shaft may also benefit from this bearing coating.

The final thickness of the coating may be 0.1 mil to 0.5 inches, or alternatively 1 mil to 0.25 inches, or alternatively about 10 mils to 0.1 inches. The number of coats and the concentration of the *Guaiacum* resin in the coating mixture are used to determine the thickness of the coating mixture that is applied.

As noted, it is believed that the coating mixture described herein is especially useful when coated on lignum vitae wood. Its usefulness is also expected on all woods, but especially all hard woods described herein. The coating may be useful on a combination of woods. It is also expected that benefits may be available with use of the coating applied on other bearing materials such as polymer, metal, ceramic, composites and combinations thereof.

Turning now to FIGS. 1-3, an example of a coated stave bearing is shown. In FIG. 1, a stave bearing assembly 10 includes multiple bearing segments 11. The stave bearing 10 is mounted around a rotating shaft 12 having a shaft sleeve 13 mounted around it. The stave bearing 10 includes multiple slots 14 into which staves 15 are inserted. The staves 15 engage the shaft sleeve 13 as the shaft 12 is turning in order to maintain the position of the turning shaft 12.

FIG. 2 is an example of a single stave 20. Stave 20 includes a bearing face 21 that actually comes into contact with a rotating shaft, for instance the rotating shaft sleeve 13 in FIG. 1. The bearing face 21 includes a coating layer 22 that is coated onto the bearing surface 21.

FIG. 3 illustrates the stave bearing 15 mounted in the stave bearing assembly 10. The stave includes a coating layer 22 that makes up the bearing surface 21 that comes into contact with the rotating shaft 12 and sleeve 13.

Figure 4:
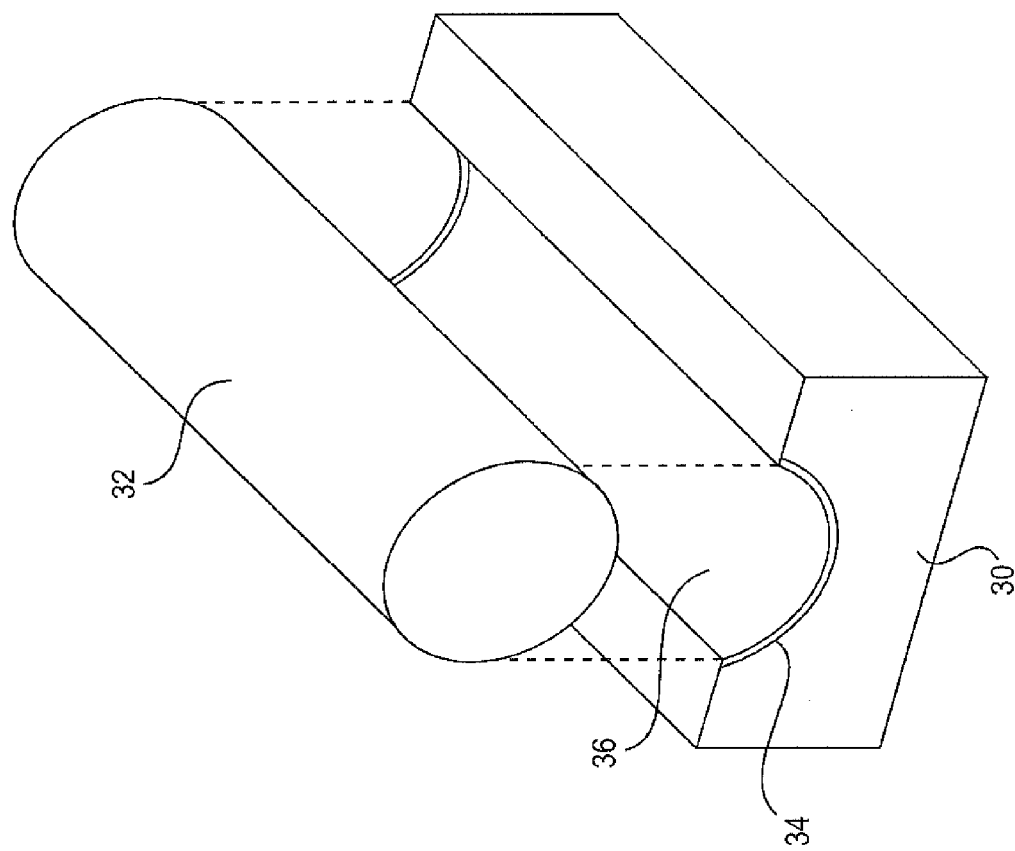
FIG. 4 is an exploded, perspective view of a shaft in a horizontal bearing.
Figure 5:
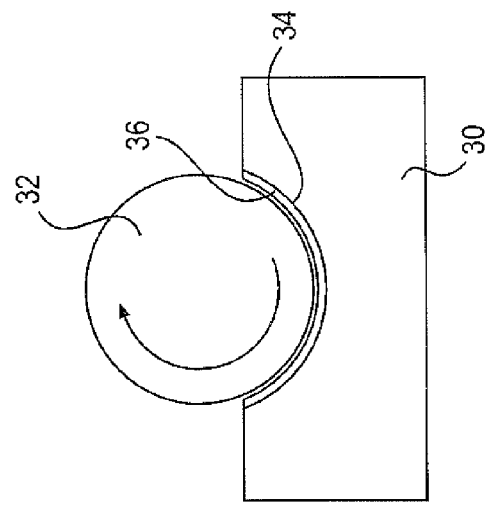
FIG. 5 is a side, cross-sectional view of a horizontal bearing and a rotating shaft therein.

FIGS. 4 and 5 illustrate a horizontal bearing 30 and rotating shaft 32 mounted therein. The horizontal bearing 30 includes a bearing surface 34 having a coating layer 36 thereon. It is the coating layer 36 that comes into contact with the rotating shaft 32. The coating layer 36 includes the *Guaiacum* resin described herein.

Example 1

Batch Extraction

The *Guaiacum* resin is extracted from the *Guaiacum* or lignum vitae wood. Slices of the wood, approximately 2 mm thick, are cut and then crushed into fine chips and scraps. These crushed chips and scraps are placed in a 2.5 gallon bath that is then filled up to cover the chips with denatured alcohol. These wood chips are then soaked in the bath for one week, with the bath/bucket being agitated approximately daily for that one week period. Next, the alcohol is boiled off of the mixture over approximately 6 to 8 hours. The lignum vitae chips are then removed with a strainer from the mixture. The mixture is then boiled down to a thick syrupy mixture that is made up of the *Guaiacum* resin. Multiple batches are run to extract sufficient amounts of the *Guaiacum* resin from the wood chips. This resin is then mixed with a solvent, typically denatured alcohol, to form a consistency that is able to be handled and coated.

Example 2

Coating Process

The *Guaiacum* resin from the extraction process is now ready to be applied to a bearing surface. In one example, a horizontal bearing made from lignum vitae wood is cleaned with denatured alcohol. The surface is then scuffed with steel wool. A layer of the *Guaiacum* resin is then painted with a brush onto the surface. This coating layer may be about 5 ml thick. This coating is allowed to dry for approximately half a day. The surface is then scuffed and another coat painted on top with the *Guaiacum* resin. The horizontal lignum vitae bearing will receive approximately 6 to 8 coats of the *Guaiacum* resin.

Other embodiments of the present invention will be apparent to those skilled in the art from consideration of the specification. It is intended that the specification and Figures be considered as exemplary only, with a true scope and spirit of the invention being indicated by the following claims.

That which is claimed is:

1. A coating mixture for use on a bearing surface comprising:
    a *Guaiacum* resin, and
    a solvent in which the *Guaiacum* resin is dissolved.

2. A coating mixture as described in claim 1,
    wherein the *Guaiacum* resin comprises about 50% or more of the coating mixture.

3. A coating mixture as described in claim 2,
    wherein the *Guaiacum* resin comprises about 90% or more of the coating mixture.

4. A coating mixture as described in claim 1, wherein the solvent comprises alcohol.

5. A coating mixture as described in claim 1, wherein the solvent comprises ethanol.

6. A coating mixture as described in claim 1,
    wherein the mixture comprises about 50 to 95% *Guaiacum* resin and 5 to 50% alcohol solvent.

7. A bearing comprising a bearing surface adapted to contact a rotating shaft surface, wherein the bearing surface is coated with a coating layer comprising a *Guaiacum* resin.

8. A bearing as described in claim 7, wherein the *Guaiacum* resin is coated on the bearing surface at a thickness of about 0.1 mil to 0.5 inches.

9. A bearing as described in claim 8, wherein the *Guaiacum* resin is coated on the bearing surface at a thickness of about 1 mil to 0.25 inches.

10. A bearing as described in claim 7, wherein the bearing is comprised of wood.

11. A bearing as described in claim 10, wherein the bearing is comprised of lignum vitae.

12. A method of improving the wear resistance of a bearing adapted to be inserted in a bearing housing, the bearing comprising a bearing surface adapted to contact a rotating shaft surface, the method comprising the steps of:

providing a coating mixture comprised of *Guaiacum* resin dissolved in a solvent; and applying a layer of the coating mixture onto a bearing surface adapted to contact a rotating shaft surface.

13. The method described in claim 12 further comprising applying a plurality of layers of the coating mixture onto the bearing surface.

14. The method described in claim 12, wherein the solvent comprises an alcohol.

15. The method described in claim 12, wherein the bearing is comprised of lignum vitae.

* * * * *